United States Patent
Grubmueller, Jr.

(10) Patent No.: US 9,687,740 B1
(45) Date of Patent: Jun. 27, 2017

(54) FIXED ODDS LOTTERY GAMING SYSTEM AND METHOD

(76) Inventor: Walter Grubmueller, Jr., Vienna (AT)

( * ) Notice: Subject to any disclaimer, the term of this patent is extended or adjusted under 35 U.S.C. 154(b) by 279 days.

(21) Appl. No.: 13/560,862

(22) Filed: Jul. 27, 2012

Related U.S. Application Data (60) Provisional application No. 61/512,737, filed on Jul. 28, 2011.

(51) Int. Cl.
| | | |
|---|---|---|
| A63F 9/24 | (2006.01) | |
| A63F 13/00 | (2014.01) | |
| G06F 17/00 | (2006.01) | |
| G06F 19/00 | (2011.01) | |
| A63F 13/45 | (2014.01) | |

(52) U.S. Cl.
CPC .......... *A63F 13/45* (2014.09); *A63F 2300/60* (2013.01)

(58) Field of Classification Search
USPC ...................... 463/16, 17, 20, 25, 26, 40, 42
See application file for complete search history.

(56) References Cited

U.S. PATENT DOCUMENTS

| | | | | |
|---|---|---|---|---|
| 9,105,146 | B2* | 8/2015 | Wolf | G07F 17/32 |
| 2007/0173312 | A1* | 7/2007 | Dodge | G07F 17/3262 |
| | | | | 463/18 |
| 2007/0287533 | A1* | 12/2007 | Amour | 463/26 |
| 2008/0111309 | A1* | 5/2008 | Nicely | G07F 17/3293 |
| | | | | 273/292 |
| 2009/0121434 | A1* | 5/2009 | Baerlocher | G07F 17/3276 |
| | | | | 273/292 |

\* cited by examiner

*Primary Examiner* — Adetokunbo O Torimiro
(74) *Attorney, Agent, or Firm* — H. John Rizvi; Gold & Rizvi, P.A.

(57) ABSTRACT

The present invention is referred to a betting/gaming system where the client can bet on numbers with fixed odds. Each cycle consists of a main event and side event and starts with the draw of a set of numbers. Different main events are possible (draws n numbers out of a population of K numbers), as well as side events. The numbers may be drawn by a mechanical device (lottery machine) or generated electronically by a random number generator. Numbers can be drawn locally or on a remote site. This new system creates new a functionality to generate additional turnover/revenue streams during a "standard" lottery drawing process through different main events with new bets, additional side-events, betting during the drawing process, etc.

17 Claims, 6 Drawing Sheets

FIG. 1

| Balls | Prize |
|---|---|
| Losers | 0 |
| 5 after 25 | 5 |
| 25 | 10 |
| 24 | 15 |
| 23 | 20 |
| 22 | 30 |
| 21 | 40 |
| 20 | 50 |
| 19 | 60 |
| 18 | 70 |
| 17 | 80 |
| 16 | 90 |
| 15 | 100 |
| 14 | 200 |
| 13 | 300 |
| 12 | 400 |
| 11 | 500 |
| 10 | 1,000 |
| 9 | 2,500 |
| 8 | 5,000 |
| 7 | 10,000 |
| 6 | 100,000 |

FIXED ODDS LOTTERY GAMING SYSTEM AND METHOD

CROSS-REFERENCE TO RELATED APPLICATION

This application claims the benefit of U.S. Provisional Patent Application No. 61/512,737, filed Jul. 28, 2011, which is incorporated by reference herein in its entirety.

BACKGROUND OF THE INVENTION

Field of the Invention

The present invention relates generally to a betting system based on lottery-like drawing of numbers. More particularly it is directed to a fixed odds lottery gaming system and method having a mechanical or random number generation device whose features are to be more fully described.

Description of the Prior Art

Lottery games can be traced all the way back to 200 B.C. in the kingdoms of China. Amongst the games that originated at that time is Keno and even to this very day players can indulge in this game. Students of the era believe that this game originated in that Far East country and maintains its appeal because of its addictive quality. It must have been very captivating since it is believed by competent researchers that the Great Wall of China was financed with this game.

Other groups, tribes and nations similarly found sport in lottery-like games. Amongst these are the Celts and the Greeks who left references to lotteries and 'drawing lots.' In the European continent the first known lottery occurred during the Roman Empire. At first these lotteries were usually conducted as a form of amusement at dinner parties for the nobility. Later during the reign of Augustus Caesar, lotteries became mechanisms of taxation. For example, there are records of the sale of lottery tickets in order to raise funds for repairs to the City of Rome. However, winners were given prizes in the form of articles of disparate value.

As time progressed local officials observed that money could easily be made from this game. It is believed that the first official record of a public lottery occurred in Holland in the 15th century. Later, the first lotteries with prizes in the form of money began to appear in numerous towns in Flanders (present day Belgium, Holland, and France). These first lotteries awarding monetary prizes and were held to raise money to aid the poor and fund fortifications of the towns. They were hailed as a less painful form of taxation and were quite popular among the people.

In the modern era, lotteries are a popular type of gambling most often run by governments and in the USA local states have been in the forefront of the lottery craze inviting tens of millions of their citizens to go for the big prize. Typically, the betting consists of drawing lots that follow certain rules whereby a winner(s) is chosen in a following those rules and a prize is awarded on a specific day.

Lotteries are available in many types of formats and state lotteries are subject to the varying laws of the states that govern them. Prizes in basic lotteries can be fixed cash sums, fixed percentage of the amount of money raised through ticket sales or goods. More modern lotteries allow ticket purchasers to choose their own numbers there opening up the possibility of multiple winners which can result in prize sharing.

Even though the above cited lottery systems of the prior art address some of the needs of the market, a new and improved lottery system is still desired.

SUMMARY OF THE INVENTION

An embodiment is directed to fixed odds lottery gaming system comprising numbers drawn from a fixed set of numbers changing odds after each draw (probability of event), including main events and side bets as explained below.

In one general aspect of an embodiment, a fixed odds lottery gaming system comprises the generation of numbers (or number draws) analogically (e.g. through a drawing machine), digitally (e.g. through a random number generator or an animated video) or remotely (through remote locations and transmitted via satellite, virtual private network (VPN), Internet, or the like).

Accordingly, it is a primary object of an embodiment to provide a fixed odds lottery gaming system that creates new functionalities to generate additional turnover/revenue during a "standard" lottery drawing process.

Another aspect of an embodiment provides a fixed odds lottery gaming system in which different main events may be followed by new bets or additional side events.

Yet another aspect of an embodiment is a fixed odds lottery gaming system with main events in which a bet on a sum of numbers is included.

Yet another aspect of an embodiment is a fixed odds lottery gaming system in which a match of all the selected numbers after a number of draws is included as a main event.

Yet another aspect of an embodiment is a fixed odds lottery gaming system in which the selection of one or several numbers per draw (e.g. a single number or line of numbers) may be included as a main event.

Also another aspect of an embodiment is a fixed odds lottery gaming system in which the bet on the next drawn number may be included as a side event or side bet.

An embodiment is related to a fixed odds lottery gaming system where the client can bet on numbers with fixed odds. Each cycle consists of main event and side events and starts with the draw of a set of numbers. Different main events are possible (draws n numbers out of a population of K numbers) as well as side events. The numbers may be drawn by a mechanical device (lottery machine) or generated electronically by a random number generator. Numbers can be drawn locally or on a remote site.

These and other aspects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

DETAILED DESCRIPTION OF REPRESENTATIVE EMBODIMENTS

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in the figure being discussed. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise. Shown throughout the Figures, the invention is directed to a betting system where the user (client) can place his/her bets on different devices. The user (client) bets on numbers which may be represented by balls similar to a lottery or bingo system. The event the client bets on may be the draw of one or more of these numbers (balls), on a real or animated machine.

This embodiment is a betting/gaming system where the client can bet on numbers with fixed odds. Each cycle consists of a main event and side event and starts with the draw of a set of numbers. Different main events are possible (draws n numbers out of a population of K numbers), including:

A bet on the sum of numbers drawn.
n numbers within a sample of k numbers out of a population of K numbers.
n numbers not drawn after K-n numbers drawn (n numbers left).

Furthermore, side events are defined as the draw of the next number drawn higher/lower/equal to the last number drawn or any selected number.

The numbers may be drawn by a mechanical device such as a lottery machine or generated electronically by a random number generator. Numbers can be drawn locally or on a remote site. The devices that can be used as acceptance stations include:

slot machines
slant tops
Bet acceptance terminals
"Internet" through any browser or mobile devices like smart phones or tablets The odds for each bet are fixed depending on the probability of the occurrence of the selected event and they may change after each "draw" as soon as probabilities change. The odds for different events may be stored in tables on the bet acceptance server or they may be calculated using defined algorithms.

Each event consists of a 'main event' and may have additional 'side events' connected thereto. These main and side events are basic events, additional events may be added at any time. The main idea in an embodiment is using one draw and all events share the same 'draw.'

Figure 1:
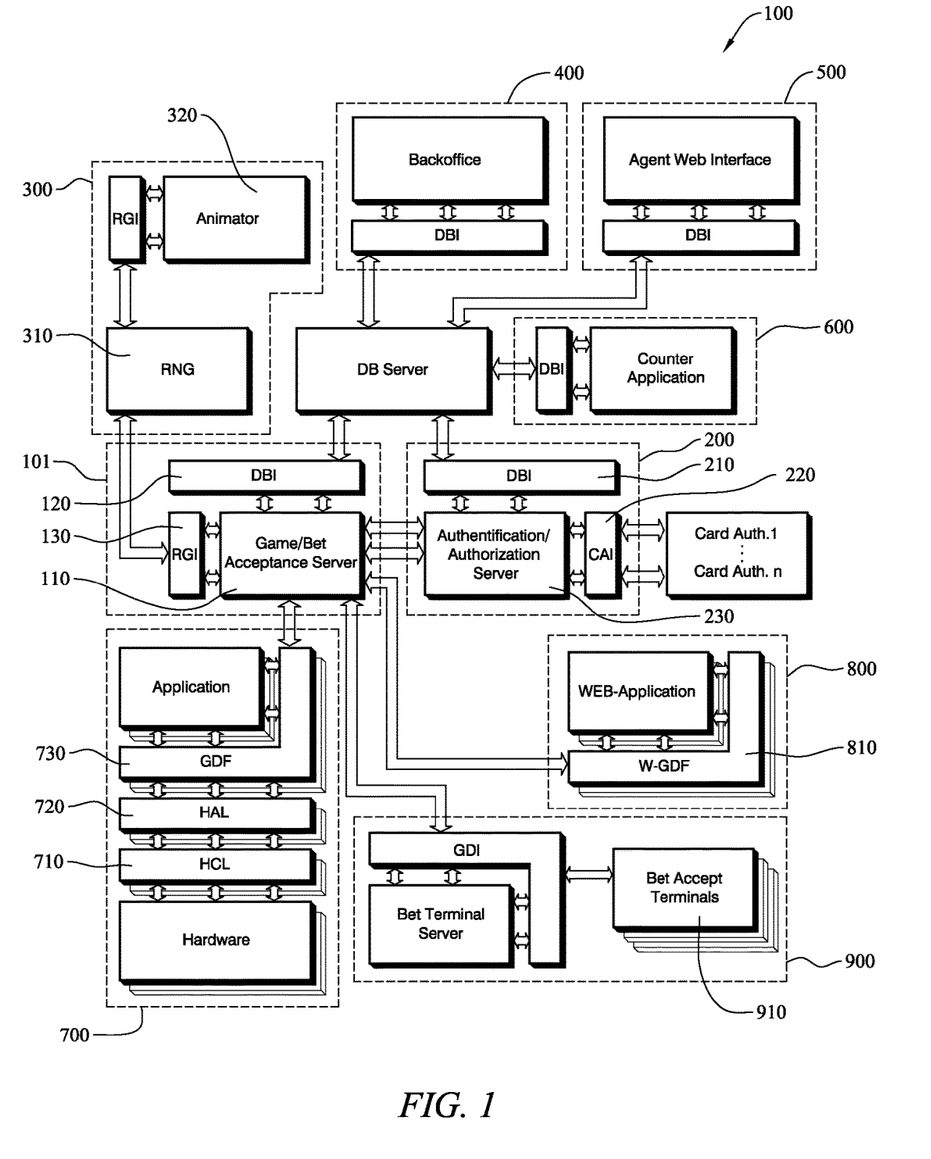
FIG. 1 is a flow chart illustrating a schematic overview of the betting system in accordance with the present invention.

A user has to obtain "CREDIT" in order to place bets on the different events. Whenever he/she places a bet the selected "STAKE" will be deducted from his/her CREDIT. In the case of winning the bet, the amount won will be added to his/her CREDIT immediately. Adding CREDIT to the user's account will be completely transparent using different methods like:

Cash in via Bank Note Acceptor (BNA)
Cash in via coin acceptors
Money transfer from "electronic purse"
'Remote In' from a counter
System Design Overview:

Making reference to FIG. 1 a short description of the main modules of the system 100 is given. The improved lottery system has a variety of components including Acceptance Server Module 101, Authentication Server Module 200, Random Number Generator Module 300, Back Office Module 400, Agent Web Interface 500, Counter Application Module 600, Betting Device Module 700, Web Application Module 800 and Bet Acceptance Module 900. Each of these are to be more fully described in the following description.

Game/Bet Acceptance Server Module:

The Acceptance Server 101 (FIG. 1) is the core of the system. The server 110 handles all the requests from the different acceptance stations and or terminals, calculates and distributes odds and routes the results from the drawing device to the connected lottery stations (slot machine, slant top) using the Betting Device Module 700; additional data is communicated to players that are using the Web Application Module 800 for web players and Bet Acceptance Module 900 at other player terminals. The Acceptance Server communicates via the database interface (DBI) 120 with the database server and the RGI 130 with the random number generation device module 300. It also communicates with the authentication server 200 for credit verification of user data.

Authentication/Authorization Server Module:

The Authorization Server Module 200 is used to identify and authorize devices and clients. Each device has to connect to this server 210 (via the Acceptance Server Module 101) where it is identified and device specific parameters are passed to the device. Each client has to be authorized—credit handling is routed via this server. The server handles credit on the site and connects to card authorization services for card validation. Card clearance will be performed via the BO system. The server communicates via the database interface DBI 210 with the database server and credit authorization interface CAI 220 with card authorization centers (CA1 . . . CAn).

Random Number Generation/Delivery Module:

A random number generator 310 is in communication with Acceptance Server Module 101. This Generator 310 is in further communication with an RGI random number generator interface that connects in to an Animator 320. Random numbers are to be provided by different devices depending upon the implementation desired. An analog device may be used to deliver random numbers according to the specification (e.g. draw 6 out of 49 without repetition and a lead time of 10 seconds between 2 numbers); another way of performing the same task is to use an electronic RNG (Random Number Generator). If a physical device is used, a lottery drawing machine could be utilized (and recorded) ☐ the drawing process will be shown as an additional visual reference for the client. The draw will be recorded using one or more cameras and stored typically as an electronic record. The result of the draw will be stored in a database as would the result of the virtual draw. If no analog device is used, an electronic RNG will generate the numbers; these numbers will be sent to the animator device 320 where a 3D animation of a drawing process will be shown. Although the numbers are not generated within the animator, it will send the numbers as they are drawn to the RNG to be routed to the Acceptance server number by a number to use the identical (internal) functions.

Back Office Module:

A Back Office Module is shown as item 400 in FIG. 1, it communicates with Database Server DB through DBI database interface. The Back Office module 400 handles all administrative tasks required to operate the system, for example:

Configuration of different devices
Maintaining agent and client databases
Connection to Credit Card clearing center
Reports and statistics Agent Web Interface Module:

The 'Agent Web Interface' Module 500 provides the possibility for agents to access their (filtered) data and gives some configuration possibilities. The Agent Web Interface Module communicates with DB server through Database Interface DBI.

Counter Application Module:

The Counter Application Module 600 may be used to sell "CREDIT" to the clients (in betting shops, arcades, etc.). Credit is sold to the clients when—for any reason—no or insufficient possibilities are provided at the bet accepting devices (Slot machines, Slant tops, etc.). Within the Counter Application Module 600 are the actual Counter Application itself connected to database server DB through a Database Interface DBI.

Betting Device (Slot Machine, Slant Top) Module:

The Betting Device Module 700 communicates with the Acceptance Server Module 101 for the placement of bets from a slot or slant machine; the results of the bets are routed back to the Betting Device Module 700 and on to the particular device. The main application on these bet accepting devices 700 is designed to be hardware independent. Several independent layers are used to separate the different modules, where HCL 710 is a 'Hardware Communication Layer,' HAL 720 is a 'Hardware Abstraction Layer' and GDF 730 'Game Developer Framework.' As its name implies, the 'Hardware Communication Layer' (HCL 710) performs the function of intercommunication between the upper layers and the local slot/slant machines. It is the lowest layer and directly communicates with the hardware of the slant/slot machines and permits the HCL 710 to communicate upstream to the 'Hardware Abstraction Layer' HAL 720 that permits abstraction or the hiding of the implementation details underneath so as to permit seamless intercommunication with the 'Game Developer Framework' GDF 730; this further permits the easy intercommunication with application(s) running on the machines.

Web Application Module:

the WEB Application Module 800 communicated with Acceptance Module 101 for authentication from the Authentication Server Module 200. In this fashion the system provides identical functionality for web based clients (identical events, identical odds, similar screen layouts, etc.) thereby providing high "recognition value". W-GDF 810 is the 'Web-Game Developer Framework' that interfaces to a Web Application used by a downstream user and permits intercommunication with Acceptance Module 101.

Bet Terminal Server Module (and Acceptance Terminals):

Bet Terminal Server Module 900 has Bet Terminal Servers shown that is connected to Acceptance Terminals 910; this is used when the number of acceptance devices is restricted to some maximum number. Just one acceptance device is provided and "stupid" terminals without any specific functionality are connected to these servers. In this case the bet acceptance device can be used by several clients simultaneously. The Bet Terminal Servers are connected to a plurality of Bet Acceptance Devices through a GDI device. Additionally, this GDI permits intercommunication with the Acceptance Server Module 101.

Main Events:

The following is a description of some of the possible bets. Similar bets can also be designed and added without altering the main concept of the present invention.

Figure 3:
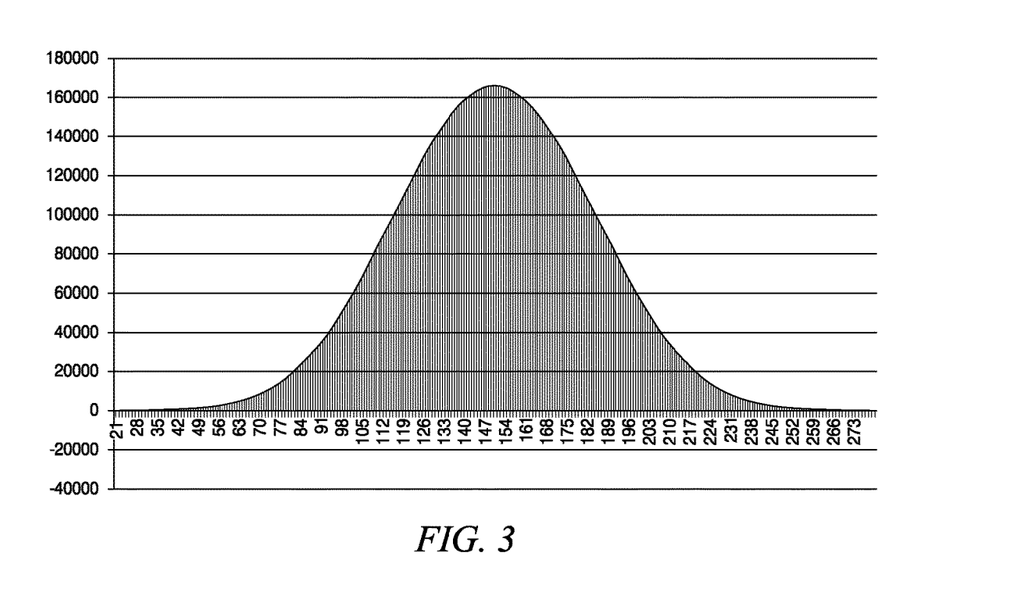
FIG. 3 is a graph showing the distribution of results in a typical event of the betting system in accordance with the present invention.
Figure 4:
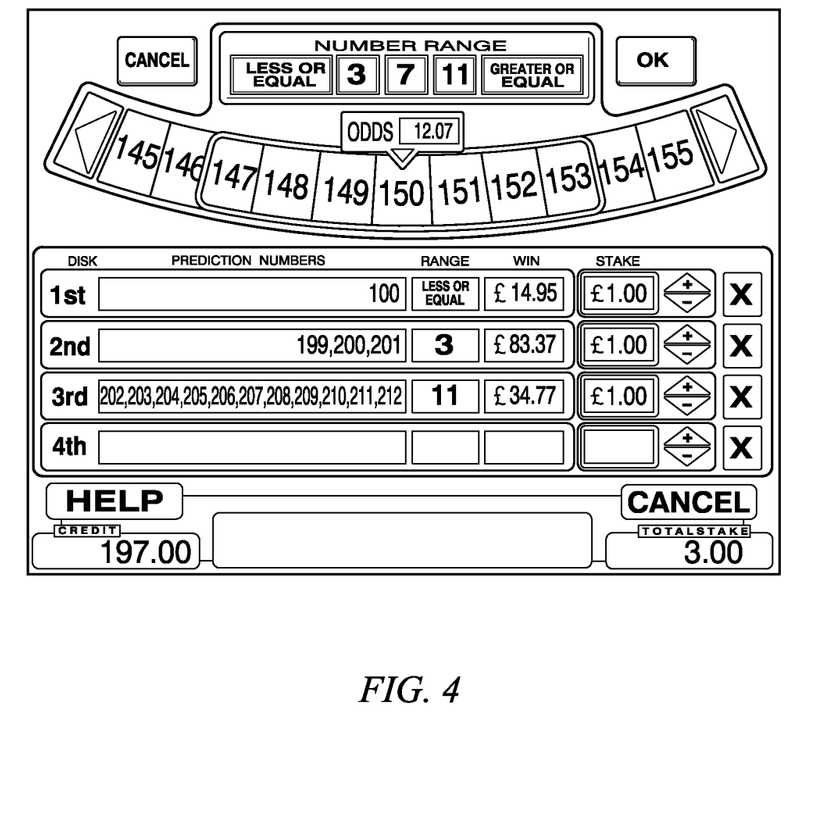
FIG. 4 is a sample of a screen for a betting event of the present system in which the user bets on a sum of numbers in a simple draw from a full set of numbers.
Figure 5:
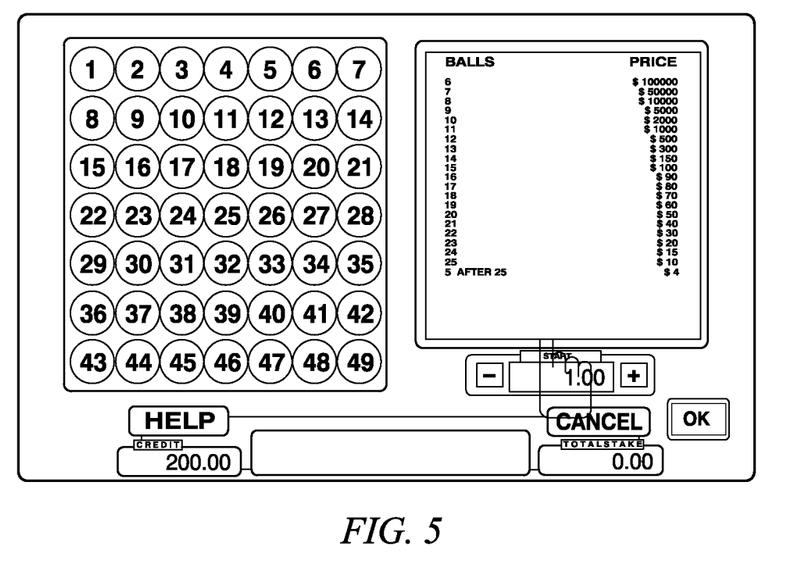
FIG. 5 shows another sample screen of a betting event in which the user must match all the selected numbers after a number of draws.

The BLS (BetLottoSum) event enables the user to bet on the sum of the results of a draw (sample of n numbers selected out of a population of N items without replacement) representing numbers 1 . . . N. This basically gives the combination of N numbers in n different forms and $(N^2-n^2)*n+1$ possible results (with numbers from $(n+1)*n/2$ to $(2+N-n+1)*n/2$ in the result set. FIG. 3 illustrates the distribution of results of a BLS event and FIG. 4 shows a sample screen for this event.

The user can select a number from the result set and place a bet if (in his opinion) the sum of then drawn numbers will be 1) less or equal; 2) greater of equal and 3) in a certain range around the selected number.

Figure 2:
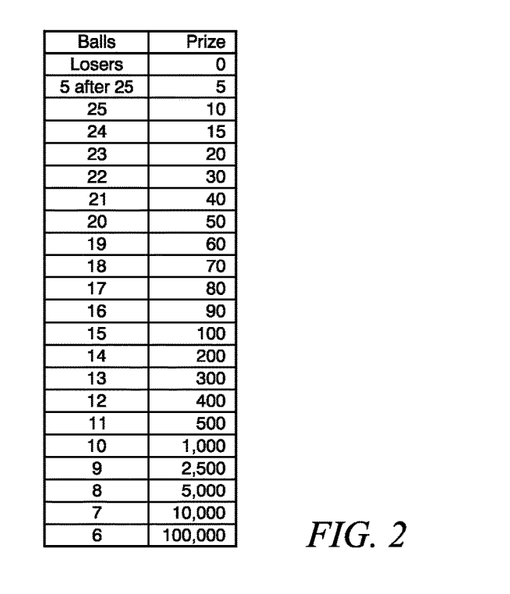
FIG. 2 is a chart that shows an example of a list of odds drawn in an exemplary betting event.

The user selects the stake for this bet and accepts his selection or cancels the input and starts all over. The order of the user action (number selection, betting type selection and stake selection) is free and the user can change any of these variables as often as he wants in any order until he accepts his selections. This user selection has to be completed before the start of the event he is betting on; it should be noted that there is an indication of the remaining betting time on the information area available to the user. The user can place more than one bet on the same event and all selected bets will be shown in an information area. The list of odds will be provided as for example illustrated in FIG. 2. User input for the main event is suspended from beginning of the event (start draw of the numbers with a predefined lead time—LEAD TIME parameter) until the end of the event (n numbers drawn). After the start of the event, the user can select a side event and continue placing bets on intermediate results.

Parameters:

Parameter sets are used to configure the behavior of the system. Configuration, Parameter sets result tables have to be validated and checked for consistency. The following list is an example of parameters used in this module:

| Name | Type | Description | Error condition |
|---|---|---|---|
| PopulationSize | numeric | Size N of population | Stop Execution |
| SampleSize | numeric | Size n of sample | Stop Execution |
| MaxOdd | numeric | Maximum value for accepted odd, bets with higher odds cannot be selected | |
| MaxSingleWin | numeric | Maximum value for possible win, values creating higher wins cannot be selected (e.g. stake for given odd) | |
| MaxSingleStake | numeric | Maximum value for stake on a single bet | |
| MaxEvent Win | numeric | Maximum value for possible win, values creating higher wins can't be selected (e.g. stake for given odd) - check opposed bets | |
| MaxE ven t S take | numeric | Maximum value for stake on a single bet | |
| MaxCredit | numeric | Values which could result in a win which would (added to the existing credit) exceed the maximum credit are not accepted - check maximum possible win on event (opposed bets) | |

BLB Event:

The BLB (BetLottoBingo) event (see FIG. 2) enables the user to select a sample of n numbers out of a population of N unique numbers (e.g. 6 out of 49). The user wins if his/her selected n numbers are drawn within the next k draws (n<=k<=K, K max number of draws, MAX B DRAWS parameter). The user just selects the numbers and the stake and confirms his/her selection. He/she can change his/her selection or place additional bets. The list of odds (winning plan) will be provided. FIG. 4 shows a sample screen for a BLB event.

User input for the main event is suspended from the beginning of the event (start the draw of the numbers with a predefined lead time—LEAD TIME parameter) until the end of the event (n numbers drawn). There may be a special win if none of the numbers selected by the user is drawn after K-n draws.

BLR Event

The BLR (BetLottoRoulette) event enables the user to select a sample of n numbers (single numbers or lines/pattern on the "betting table") out of a population of N unique numbers (e.g. N=49 or N=36, n is variable). The user wins if one of his selected numbers is drawn on the next draw. Since there is no replacement of the drawn numbers, odds for each new draw vary depending on the new probabilities and will be recalculated after each number drawn. One possible presentation of the numbers the user can select is layout similar to a roulette table. He/she can select numbers 1 to 36 or he selects "greater than 36" which replaces the "zero betting field" on the table if the population (N) of the numbers is greater than 36 (e.g. 49).

The user input for the main event is suspended from the beginning of the event (start draw of the numbers with a predefined lead time—LEAD TIME parameter) until the end of the event (n numbers drawn).

Figure 6:
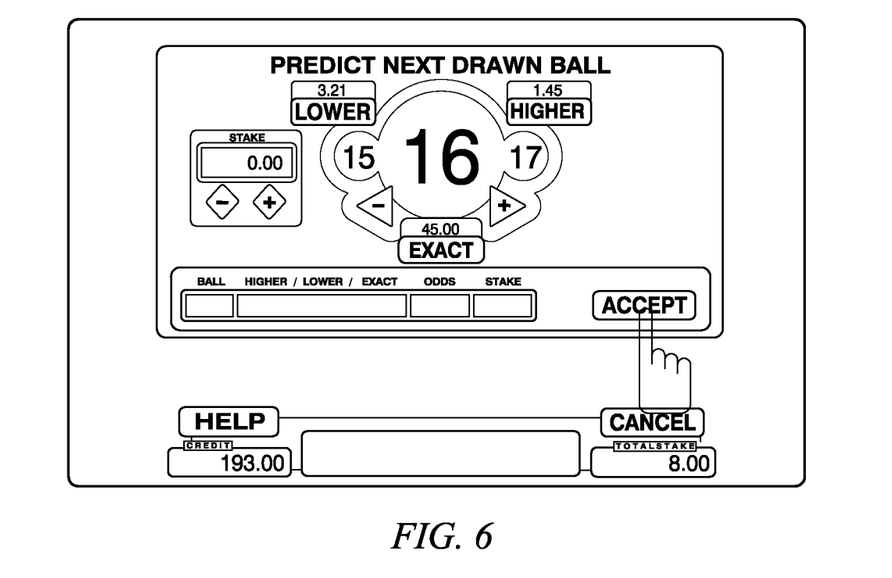
FIG. 6 shows the screen of another side event in which the user must bet on the next drawn number.

BLHL Event:

The BLHL (BetLottoHiLo) event enables the user to bet during the draws of the main event on the next number drawn. He/she can select: 1) Higher than a given number; 2) Lower than a given number; 3) Exact given number. The last drawn number is a suggestion for the next HI-LO bet, but the user can change this number to whatever number he/she selects within the given range of numbers. Impossible bets—basically bets with a probability of zero—are not acceptable at all. For example: 1) An exact match of an already drawn number; 2) Bets lower than 1 or the lowest possible number and 3) Bets Higher than N or the highest possible number. Bets with odds lower than a given value (e.g. 1.25 MIN PAYOUT RATE parameter) will not be available either. FIG. 6 shows a sample screen for a BLHL event.

Figure 7:
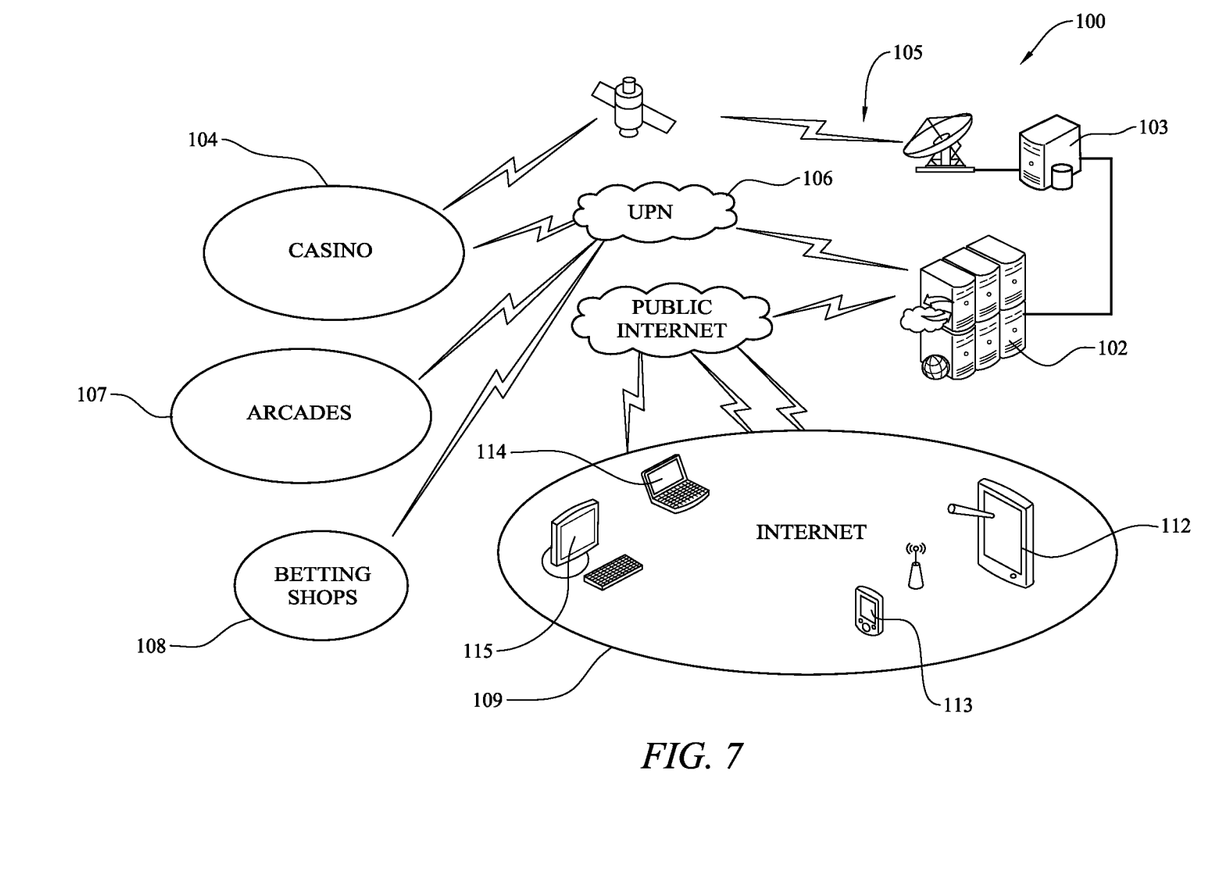
FIG. 7 shows schematically a general overview of the system in accordance with a first embodiment of the present invention.

Making reference to FIG. 7 a general overview of the present system 100 is shown. The system comprises central servers 102 connected to draw servers 103 which in turn may be connected to casinos 104 via an uplink 105 downlink 122 connection. The central servers 102 are also able to be connected to casinos 104, arcades 107 or betting shops 108 through a VPN tunnel 106. The connection may also be established through the public internet network 109. To create the connection between the user and the system 100 the user may use iPads 112, smart phones 113, laptops 114, desktops 115 and similar devices.

Figure 8:
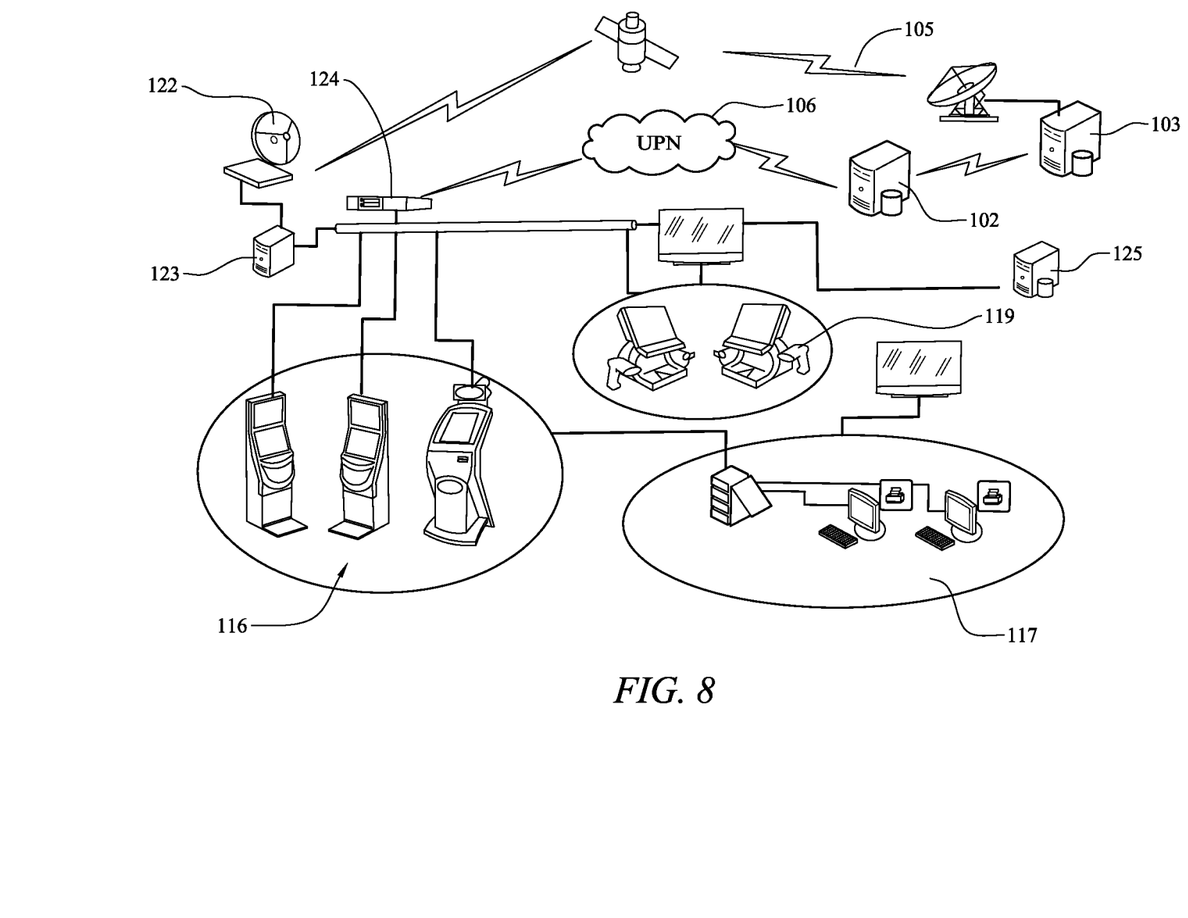
FIG. 8 shows schematically a general overview of the system in accordance with a second embodiment of the present invention.

FIG. 8 illustrates an alternative configuration of the general system 100 including lottery terminals 116, acceptance terminals 117, and OTC betting devices 119. The uplink 105 can also involve a satellite receiver 122 with a site controller 123 and a site network 124. The servers may also include a local acceptance server 125. In this implementation central servers 102 intercommunicate with lottery terminals 116, acceptance terminals 117, and OTC betting devices 119 through the aegis of a VPN tunnel that talks back and forth with site network 124. An alternative communication mechanism is provided through the use of draw servers 103 that are satellite uplink 105 downlink connection and on to site controller 123 that communicates via cabling to the final devices as shown.

Finally, it is also possible to organize different events/bets/games at the same time. on the same drawing event. There are several forms to perform this possibility but one alternative would be on different devices (e.g. two different slot-machines standing side to side) or even in the same machine (e.g. split-screen technology). Any event/bet/game may be played for example BLB (BetLottoBingo) and BLR (BetLottoRoulette) at the same time based on the same physical drawing.

While the preferred embodiments of the invention have been described above, it will be recognized and understood that various modifications can be made in the invention and the appended claims are intended to cover all such modifications which may fall within the spirit and scope of the invention.

What is claimed is:

1. A gaming method comprising the steps of:
    placing a main bet, said step of placing a main bet comprising:
        detecting a number selected by a user via a betting device;
        detecting a stake for said number entered by the user into the betting device; and
        confirming the number and the stake at the betting device;
    drawing a set of numbers front a population of numbers by a random number generator device, said drawn set of numbers to be used for determining a result of said main bet, wherein numbers of said drawn set of numbers are drawn one at a time;

determining if the user wins if the selected number satisfies a winning condition when the number is compared to the drawn set of numbers;

carrying out a side bet during said step of drawing a set of numbers, said step of carrying out a side bet comprising:

detecting a side bet stake entered by said user into said betting device prior to a drawing of one number of said set of numbers;

detecting a side bet number selected by the user;

after said drawing of said one number, determining said side bet is a winning bet if the selected side number satisfies a winning condition when the selected side number is compared to the drawn one number for the side bet;

at an acceptance server module:

receiving the bets;

calculating odds relating to the bets;

routing generated random number results from the random number generator device to the betting device;

providing calculated odds to a user; and wherein, said betting device does not allow said user to modify said selected number and stake throughout said step of drawing a set of numbers.

2. The gaming method of claim 1, wherein said step of drawing a set of numbers comprises drawing numbers one at a time without replacement and presenting drawn numbers on a layout similar to that of a roulette table, said method further comprising a step of determining said main bet is a winning bet when the selected number is drawn.

3. The gaming method of claim 1, wherein the betting device is from a device group consisting of: a slot machine, a slant top, a bet acceptance terminal, an internet connected device, a mobile device, a smart phone, a tablet and a browser based device.

4. The gaming method of claim 1, wherein the random number generator device is from a device group consisting of: a mechanical device, a lottery device, an electronic random number generation device, a local device, a remote device, a mechanical local device, a mechanical remote device, a lottery local device, a lottery remote device, an electronic random number generation local device and an electronic random number generation remote device.

5. The gaming method of claim 1, wherein the betting device and the random number generator device are in communication over a computer network.

6. A gaming method comprising the steps of:

placing a main bet, said step of placing a main bet comprising:

detecting a selected number entered by a user via a betting device;

detecting a stake for said selected number entered by the user into the betting device; and confirming the selected number and the stake at the betting device;

drawing a set of numbers from a population of numbers by a random number generator device, said drawn set of numbers to be used for determining a result of said main bet, wherein numbers of said drawn set of numbers are drawn one at a time, said betting device not allowing said user to modify said selected number and stake throughout said step of drawing a set of numbers;

determining if the user wins if the selected number satisfies a winning condition when the selected number is compared to the drawn set of numbers;

carrying out a side bet during said step of drawing a total of n numbers, said step of carrying out a side bet comprising:

detecting a side bet stake entered by said user into said betting device prior to a drawing of one number of said set of numbers;

detecting a side bet number selected by the user;

after said drawing of said one number, determining said side be winning bet if the selected side number satisfies a winning condition when the selected side number is compared to the drawn one number;

at an acceptance server module:

receiving the bets;

calculating odds relating to the bets;

routing generated random number results from the random number generator device to the betting device;

providing calculated odds to a user;

calculating a sum by adding said set of numbers drawn from said population of numbers; and determining said main bet is a winning bet if a main bet criteria is met, said main bet criteria being one of said sum being greater than a preselected value of said selected number, said sum being equal to a preselected value of said selected number, said sum being less than a preselected value of said selected number and said sum being within a user-selected range of values.

7. The gaming method of claim 6, further comprising the steps of:

calculating a sum by adding said set of numbers drawn from said population of numbers;

determining said main bet is a winning bet if a main bet criteria is met, said main bet criteria being one of said sum being greater than a preselected value of said selected number, said sum being equal to a preselected value of said selected number, said sum being less than a preselected value of said selected number and said sum being within a user-selected range of values.

8. The gaming method of claim 6, wherein said step of drawing a set of numbers comprises drawing numbers one at a time without replacement and presenting drawn numbers on a layout similar to that of a roulette table, said method further comprising a step of determining said main bet is a winning bet if said selected number is comprised within a first subset of numbers drawn from said population of numbers.

9. The gaming method of claim 6, comprising a step of determining if said main bet is a winning bet if said selected number matches one or more of numbers remaining in said population after drawing said set of numbers.

10. The gaming method of claim 6, comprising a step of determining said main bet is a winning bet when said selected number is drawn.

11. The gaming method of claim 6, wherein the betting device is from a device group consisting of: a slot machine, a slant top, a bet acceptance terminal, an internet connected device, a mobile device, a smart phone, a tablet and a browser based device.

12. The gaming method of claim 6, wherein the random number generator device is from a device group consisting of: a mechanical device, a lottery device, an electronic random number generation device, a local device, a remote device, a mechanical local device, a mechanical remote device, a lottery local device, a lottery remote device, an electronic random number generation local device and an electronic random number generation remote device.

13. A gaming system comprising:
a betting device, permitting user placing of a main bet by entering a selected number and a stake for said selected number, and by confirming the selected number and the stake;
a random number generating device, configured to draw a set of numbers from a population of numbers, said drawn set of numbers to be used for determining a result of said main bet, Wherein numbers of said drawn set of numbers are drawn one at a time; wherein
said system comprises computer-readable storage means for causing a processor to carry out the operations of:
determining if the user wins if the selected number satisfies a winning condition when the selected number is compared to the drawn set of numbers;
detecting a side bet stake entered by said user into said betting device prior to a drawing of one number of said set of numbers;
detecting a side bet number selected by the user;
after said drawing of said one number, determining said side bet is a winning bet if the selected side bet number satisfies a winning condition when the selected side number is compared to the drawn one number; and
providing calculated odds to a user;
an acceptance server module configured to:
receive the bets;
calculate odds relating to the bets;
route generated random number results from the random number generating device to the betting device; and
determining said main bet is a winning bet if said selected number is comprised within a first subset of numbers drawn from said population of numbers.

14. The gaming system of claim 13, wherein the betting device is from a device group consisting of: a slot machine, a slant top, a bet acceptance terminal, an internee connected device, a mobile device, a smart phone, a tablet and a browser based device.

15. The gaming system of claim 13, wherein the random number generating device is from a device group consisting of: a mechanical device, a lottery device, an electronic random number generation device, a local device, a remote device, a mechanical local device, a mechanical remote device, a lottery local device, a lottery remote device, an electronic random number generation local device and an electronic random number generation remote device.

16. The gaming system of claim 13, wherein the betting device and the random number generator device are in communication over a computer network.

17. A gaining method comprising the steps of:
placing a main bet, said step of placing a main bet comprising:
detecting a number selected by a user via a betting device;
detecting a stake for said number entered by the user into the betting device; and
confirming the number and the stake at the betting device;
drawing a set of numbers from a population of numbers by a random number generator device, said drawn set of numbers to be used for determining a result of said main bet, Wherein numbers of said drawn set of numbers are drawn one at a time;
determining if the user wins if the selected number satisfies a winning condition when the number is compared to the drawn set of numbers;
carrying out a side bet during said step of drawing a set of numbers, said step of carrying out a side bet comprising:
detecting a side bet stake entered by said user into said betting device prior to a drawing of one number of said set of numbers;
detecting a side bet number selected by the user;
after said drawing of said one number, determining said side bet is a winning bet if the selected side number satisfies a winning condition when the selected side number is compared to the drawn one number for the side bet;
at an acceptance server module:
receiving the bets;
calculating odds relating to the bets;
routing generated random number results from the random number generator device to the betting device;
providing calculated odds to a user; and
determining said main bet is a winning bet if said selected number matches one or more numbers remaining in said population after drawing said set of numbers.

* * * * *